Figure 1:
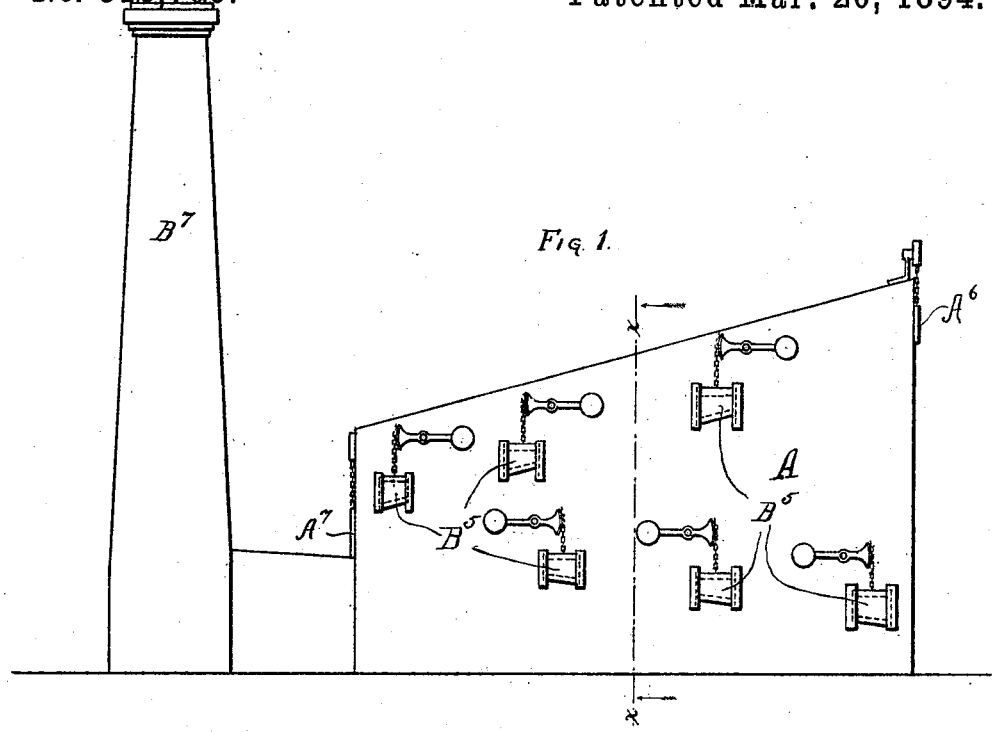

(No Model.) 3 Sheets—Sheet 1.

W. L. JOHNSON.
GARBAGE CREMATORY OR FURNACE.

No. 516,706. Patented Mar. 20, 1894.

Witnesses.

Inventor
William L. Johnson.

(No Model.) 3 Sheets—Sheet 2.
W. L. JOHNSON.
GARBAGE CREMATORY OR FURNACE.
No. 516,706. Patented Mar. 20, 1894.
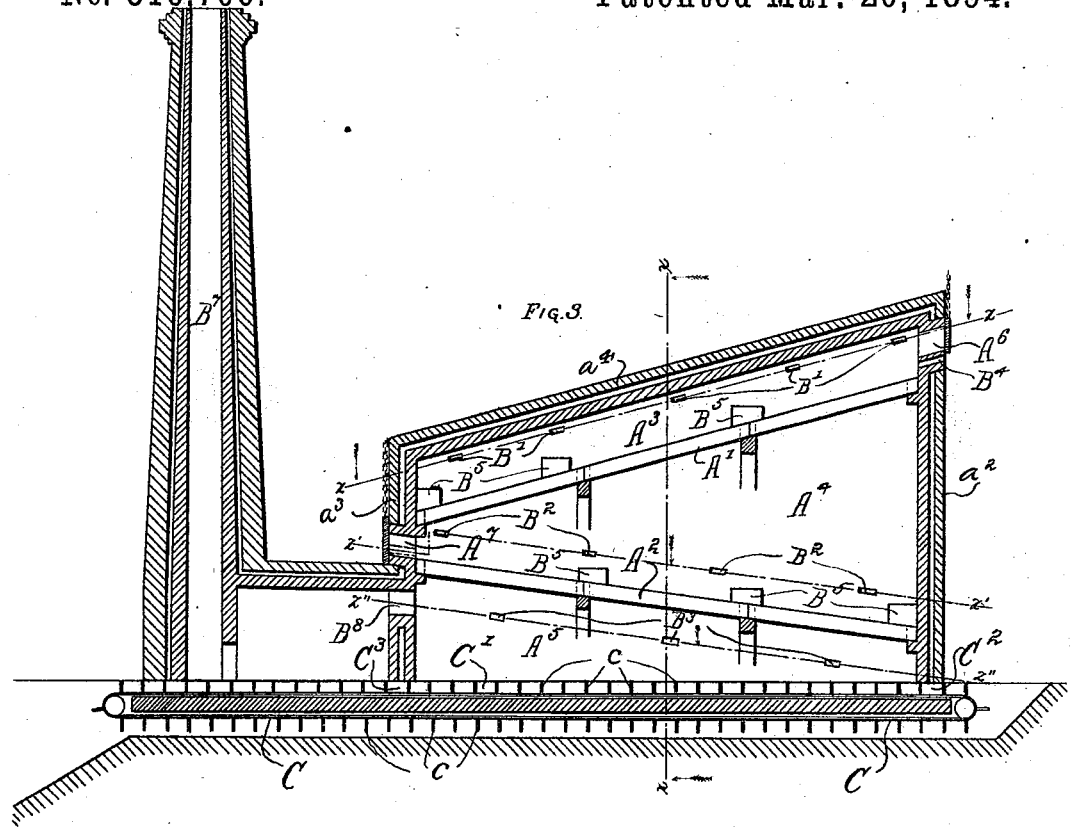
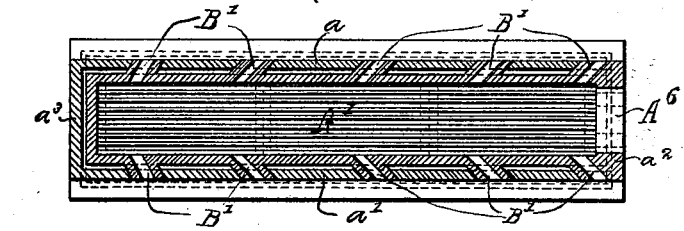
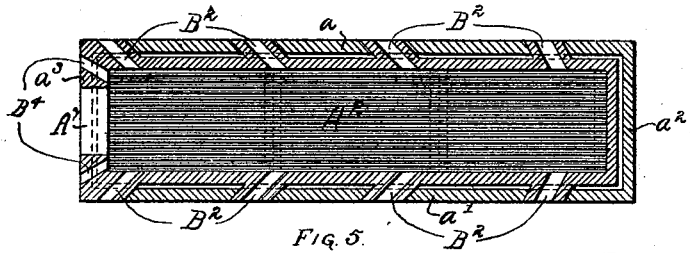
Witnesses
Inventor
William L. Johnson.
By Geo. E. Waldo, his Atty (No Model.) 3 Sheets—Sheet 3.
W. L. JOHNSON.
GARBAGE CREMATORY OR FURNACE.
No. 516,706. Patented Mar. 20, 1894.
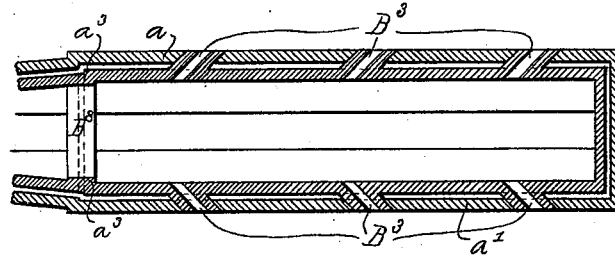
Fig. 6.
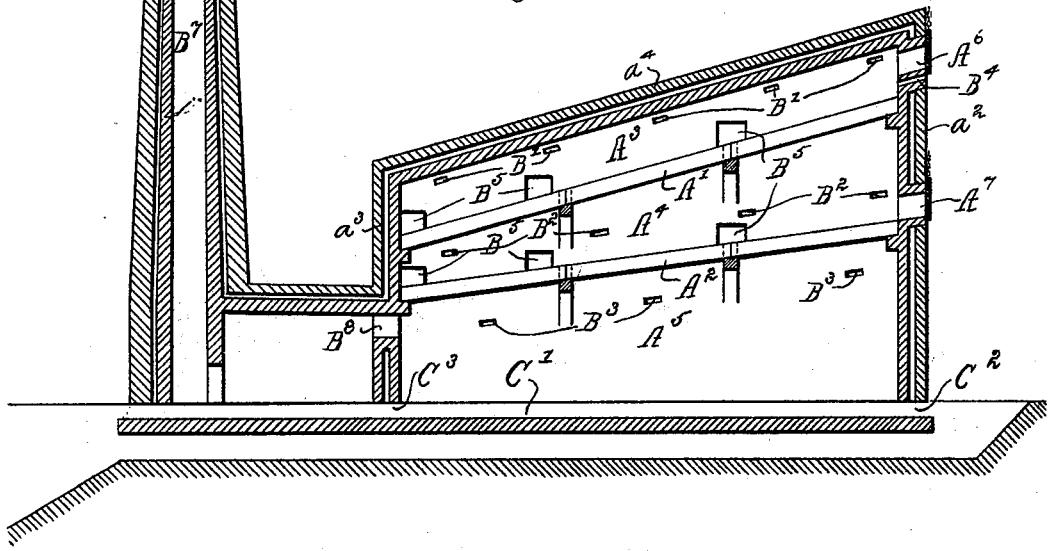
Fig. 7.
Witnesses
Byron B. Carter
A. W. Underwood
Inventor
William L. Johnson.
By Geo. E. Waldo, his Atty.
THE NATIONAL LITHOGRAPHING COMPANY,
WASHINGTON, D. C.

UNITED STATES PATENT OFFICE.

WILLIAM L. JOHNSON, OF CHICAGO, ILLINOIS.

GARBAGE CREMATORY OR FURNACE.

SPECIFICATION forming part of Letters Patent No. 516,706, dated March 20, 1894.

Application filed February 20, 1893. Serial No. 463,002. (No model.)

*To all whom it may concern:*

Be it known that I, WILLIAM L. JOHNSON, of Chicago, county of Cook, and State of Illinois, have invented certain new and useful Improvements in Garbage Crematories or Furnaces; and I do declare that the following is a full, clear, and exact description thereof, reference being had to the accompanying drawings, and to the letters of reference marked thereon, which form a part of this specification.

This invention relates to furnaces or crematories for burning garbage.

The conception of treating garbage by subjecting it to the direct action of a powerful oxidizing flame, whereby the organic portions thereof, including disease germs, are consumed, leaving nothing but an inorganic, incombustible residue, is old and many furnaces for so treating garbage have been devised. As heretofore constructed, however, such furnaces for so treating garbage, have been absolute failures or have operated but very imperfectly and at great expense. The object of the present invention is to provide an improved furnace for the purpose of so treating garbage.

A furnace or crematory embodying my invention comprises an inclosed grate upon which the garbage is delivered; burners preferably of a type adapted for the consumption of crude petroleum, the heat and flame from which are applied directly to the top and bottom of the mass of garbage; and a blast projected upon the mass of garbage, either diagonally or lengthwise of the grate, and of such strength that the garbage will be kept in constant motion along said grate.

The invention also consists in various other features, combinations of features and details of construction hereinafter described and then specifically pointed out in the appended claims.

When the garbage contains a large percentage of incombustible material, as ashes and the like, I prefer to screen or sift it before delivering it to the crematory. The coarser and finer portions of the garbage are then treated separately in substantially the manner above described. This may be conveniently and economically effected by constructing a furnace with two grates, the coarser garbage being delivered upon one and the finer garbage upon the other of said grates, preferably the coarser upon the upper and the finer upon the lower grate.

In the accompanying drawings I have illustrated my improvements as embodied in a furnace specially adapted for the treatment of garbage after it has been screened or sifted.

Figure 2:
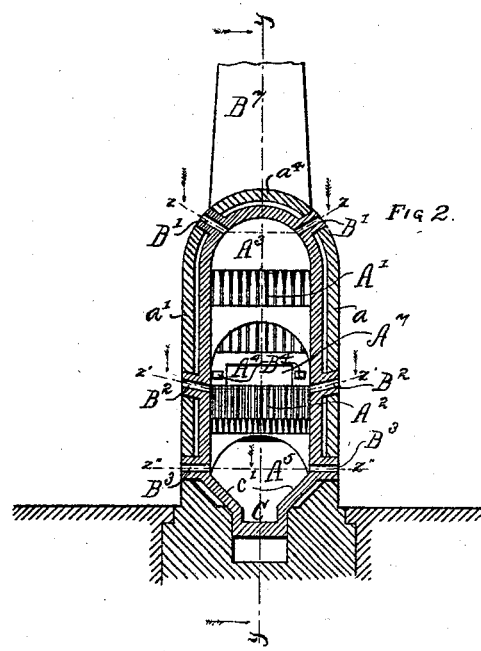

In the drawings Figure 1 is a side elevation of said crematory. Fig. 2 is a transverse vertical section thereof on the line $x$—$x$ of Fig. 1. Fig. 3 is a vertical longitudinal section thereof on the line $y$—$y$ of Fig. 2. Figs. 4, 5 and 6 are sections of the crematory on the lines Z—Z, Z'—Z' and Z²—Z² respectively of Fig. 3, and Fig. 7 is a vertical longitudinal section of a modified form of crematory, adapted to effect the cremation of garbage according to my improved process.

The crematory illustrated is of the type specially designed and adapted for the cremation of garbage which has been previously sifted or screened. Any approved means may be employed for screening or sifting said garbage, such means form no part of the present invention however, and are not shown.

Referring now particularly to Figs. 1 to 6, both inclusive, A represents the crematory as a whole, of which $a$, $a'$ are the side walls, $a^2$, the front wall, $a^3$, the rear wall and $a^4$ the top. Grates A' and A² divide the interior of the crematory into compartments A³, A⁴ and A⁵. The garbage after being screened or sifted is delivered to the crematory by suitable mechanism, not shown, through doors A⁶ and A⁷, formed in the front and rear walls, $a^2$ and $a^3$ of the crematory, and opening into the chambers or compartments, A³ and A⁴, respectively. The coarser garbage is delivered into one, and the finer garbage into the other of said compartments. For convenience the ends of the chambers, A³ and A⁴, in which the doors A⁶ and A⁷ are located, will be hereinafter referred to as the front ends, and the ends remote therefrom as the rear ends thereof. Thus the opposite ends of said chambers will be adjacent to each other, and their corresponding ends will be at opposite ends of the crematory. Burners which, for purposes of convenient reference are collectively designated by B, and which are preferably of a type adapted for burning crude petroleum, are located in the walls of the crematory and suitable connections are made for employing a blast in connection therewith, in a familiar manner. The burners B', B², in the walls of the combustion chambers A³ and A⁴ respectively, are located above the intended level of the layer of garbage and are so directed that the heat and flame therefrom will be projected upon the top of said layer of garbage and diagonally across the chambers in which they are respectively located and toward the rear thereof, that is toward the end thereof remote from that at which the garbage is delivered thereto. By placing the burners and accompanying blast on opposite sides of the crematory alternately, so that the garbage is driven from side to side of the crematory, the garbage is better exposed to the action of the reducing flame, and the operation of the crematory is rendered more perfect. The burners B', B², are also deflected so that the heat and flames therefrom are projected by the blast upon the top of the layer of garbage on the grates. As shown, the burners B³, in the walls of the lowermost chamber, A⁵, are likewise directed diagonally across and toward what I designate the rear end thereof, that is toward the end thereof in which is the opening to the smoke stack, but this arrangement is not essential. The burners, B³, in the chamber A⁵, may or may not be deflected downward, as desired. The burners, B⁴, in the front ends of the chambers, A³ and A⁴, are directed lengthwise of said chambers and preferably in a direction substantially parallel with the floors of the chambers in which they are located and are placed at such a height above the floors of said chambers that they will bear directly upon the end of the mass of garbage being delivered to said chambers through the doors, A⁶ and A⁷.

The arrangement of the burners in the various chambers is clearly illustrated in Figs. 4 to 6 of the drawings.

In the type of furnace illustrated, the means provided for keeping the mass of garbage in motion from the front to the rear of the chambers, A³ and A⁴ consist of the blasts from the burners, B', B² and B³. That the blast may the more easily move said garbage, the grates forming the floors of said chambers are made to decline toward the rear end of their respective chambers, as clearly shown in Fig. 3. Gravity thus tends to move the garbage in the same direction as the blast, and thereby greatly facilitates the action of said blast. This angle of descent may vary considerably, but a desirable decline for ordinary purposes is about fifteen degrees for the grate upon which the coarse garbage is delivered, and from seven degrees to ten degrees for the grate upon which the finer garbage is delivered.

It will sometimes happen that an obstruction, as a clinker or the like, too large to be moved by the blasts from the burners will be delivered into, or will form in the crematory. To provide for the removal of any such obstructions, openings, B⁵, which may be closed by suitable doors, B⁶, are provided in the walls of the crematory through which a rake may be inserted to break up or dislodge such obstruction. The products of combustion pass from the crematory into the stack, B⁷ through an opening, B⁸ in the rear wall of the lowermost chamber, A⁵ of the crematory. Thus the draft is downward through the upper chambers into and through the lowermost, and all of the products of combustion just before they escape into the air, are subjected to the action of an intense heat in the chamber A⁵, which operates to destroy all noxious and offensive odors or vapors, and to destroy any germs of disease or other organic matter which may come into said chamber. In this chamber, also, are deposited the ashes from the upper chambers, and suitable means of any approved form are provided for removing them from said chamber. As illustrated these means comprise a link belt, C, to which are secured flights c. This conveyer traverses said chamber lengthwise in a groove or channel, C', in the bottom of said chamber. The conveyer enters the crematory through a hole or opening, C², in the front wall, a², of the crematory and passes out through a hole or opening C³, in the rear wall, a³, thereof. The distance between successive flights is less than the thickness of the walls, a² and a³ at the points where the conveyer, C, passes through them, both of said openings are thus always closed by the flights, c, of the conveyer, whereby the escape of gases from said crematory in any considerable quantities is prevented. Preferably also the bottom of the crematory declines from the sides toward the channel, C', as clearly shown at, c', Fig. 2. Ashes falling upon these inclined surfaces, descend by gravity into the channel, C', and are removed thence by the conveyer, C.

The lining of the crematory as well as all other parts thereof exposed to the action of the heat, are constructed of highly refractory material, as fire brick or the like, after the usual manner of constructing such furnaces.

In a furnace of the construction described, the contents of the chamber or compartment, A³ will be exposed on top to the action of a direct heat from the burners, B', and on the bottom to the action of a powerful reverberatory heat from the burners, B² in the chamber, A⁴. In a similar manner the contents of the chmber, A⁴, are exposed on top to an intense direct heat from the burners, B², and at the bottom to a reverberatory heat from the burners, B³, in the chamber A⁵, while everything which is discharged into or passes through the chamber, A⁵, is subjected to a high degree of heat from the burners B², in the chamber A⁵. Thus is the application of heat, in the manner described, effected. In the preferable form of the crematory as described, also, the grates, A' and A², which divide the crematory into compartments are shown as inclined in opposite directions, and the blasts and the draft incident thereto in adjacent chambers, are toward opposite ends of the crematory. This arrangement while desirable is not essential, and I do not desire to be limited thereto, as it is possible to vary the construction of the furnace without departing from the principle of the invention. Such a modification is illustrated in Fig. 7. The general construction of this modified form of the crematory is substantially identical with that of the furnace illustrated in Figs. 1 to 6, and need not be described further. The burners B' and B² however, and the blast used in connection therewith, are so placed and arranged, that the heat and flames will traverse all of the compartments in the same direction from front to rear of the crematory. The garbage enters the chambers, A³ and A⁴ at the same end of the crematory, the doors, A⁶ and A⁷, being in the same end thereof, and the grates, A' and A², decline in the same direction.

The size of my crematory may be varied to meet requirements, but a desirable size for ordinary purposes is about thirty feet in length by about six feet in width, and a height of from two and one half to four feet for each chamber at its lowest point.

The practical operation of my improved crematory is as follows:—Prior to the admission of garbage thereto, the crematory is closed and the flame and blast turned on. When the interior of the crematory is heated to a desired degree, garbage is admitted thereto through the doors, A⁶ and A⁷ provided for that purpose, and the blast used in connection with the burners, B', B² and B⁴, operates to keep said garbage in motion lengthwise of the combustion chambers, toward the rear end thereof. The garbage on the grate, A' is exposed on top to the action of an intense direct heat from the burners, B', and on the bottom to an intense reverberatory heat from the burners, B² of the chamber A⁴ in an obvious manner. The blast used in connection with the burners, B', of the chamber A³, will operate to drive off the ashes from the top of the garbage, and the motion of the garbage over the grate will operate to sift out the ashes formed at the bottom of said mass of garbage. The garbage delivered upon the grate, A² is undergoing a similar process, the result of the combined action of the heat and flames and blasts from the burners, B² and B³. The draft created by said blasts further operates to draw the ashes down into the chamber, A⁵, whence they are removed by means of the carrier or conveyer, C. Other products of combustion, the gases and the like, after traversing the length of the furnace and being subjected to an intense heat in the chamber, A⁵, finally pass into the stack and escape into the air.

I claim—

1. In a garbage crematory the combination, with a combustion chamber into which the garbage is delivered, of a blast directed against said garbage to keep it in motion along said combustion chamber, substantially as described.

2. In a garbage crematory, the combination with a grate upon which the garbage is delivered, of burners above and below said grate and a blast projected upon the top of said garbage and diagonally across the crematory toward the rear end of said grate, substantially as described.

3. In a garbage crematory the combination with a grate upon which the garbage is delivered, of burners above and below said grate, a blast projected upon the top of said garbage and diagonally across the crematory toward the rear end of said grate, and a blast directed against the front end of said garbage, substantially as described.

4. In a garbage crematory, the combination with an inclined grate, upon the front end of which the garbage is delivered, of burners above and below said grate, a blast projected upon said garbage and diagonally across said crematory toward the lower end of said grate and a blast directed against the front end of said garbage, substantially as described.

5. In a garbage crematory the combination with a grate upon which the garbage is delivered, of burners above and below said grate, a blast projected upon the top of said garbage and diagonally across the crematory and a smoke stack opening in the lowermost chamber of the crematory, substantially as described.

6. In a garbage crematory the combination with an inclined grate upon which the garbage is delivered, of burners above and below said grate, a blast projected upon the top of said garbage and diagonally across the crematory toward the lower end of the grate, and a smoke stack opening in the lowermost chamber of the crematory, substantially as described.

In testimony that I claim the foregoing as my invention I hereunto set my hand this 10th day of February, 1893.

WILLIAM L. JOHNSON.

Witnesses:
A. W. UNDERWOOD,
GEO. E. WALDO.